May 12, 1964  W. J. KRUPICK ETAL  3,132,524
SUB-MINIATURE FLUID DAMPER GYRO, FITTED WITH
TEMPERATURE COMPENSATION MECHANISM
Filed July 1, 1960  5 Sheets-Sheet 1

WALTER J. KRUPICK
MICHAEL GABOR
INVENTORS

BY Andrew L. Bain

ATTORNEYS

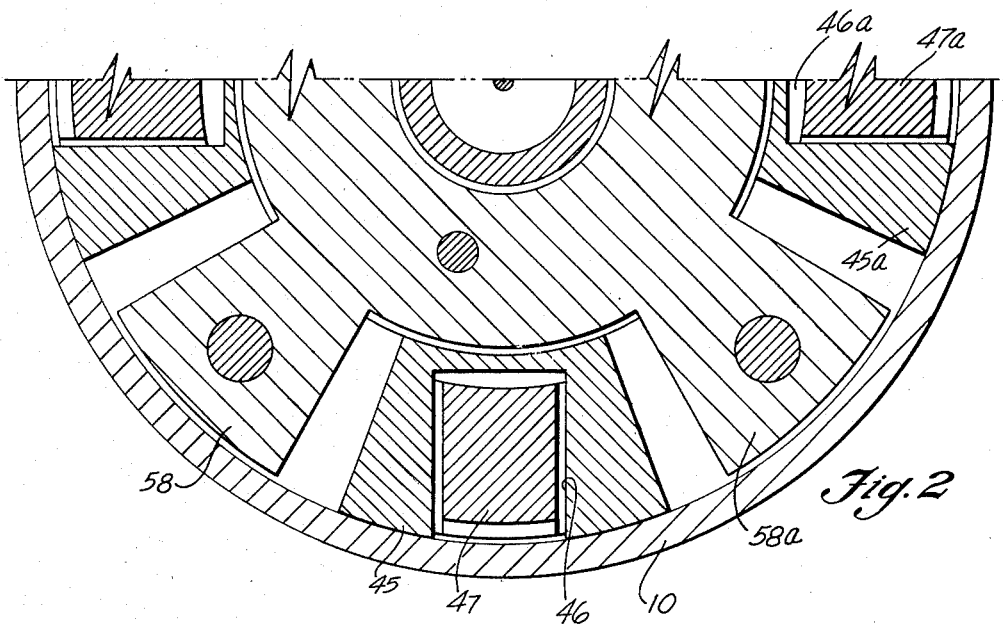

WALTER J. KRUPICK
MICHAEL GABOR
INVENTORS

BY Andrew L. Bain

ATTORNEYS

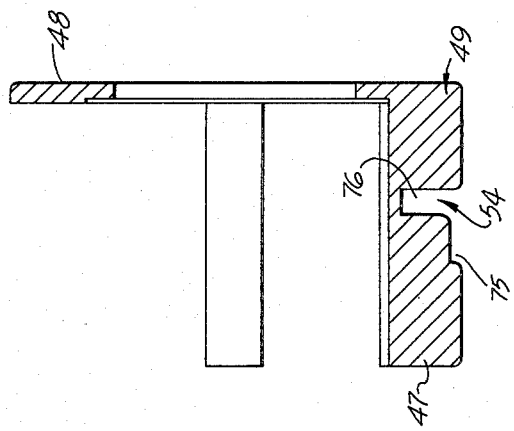
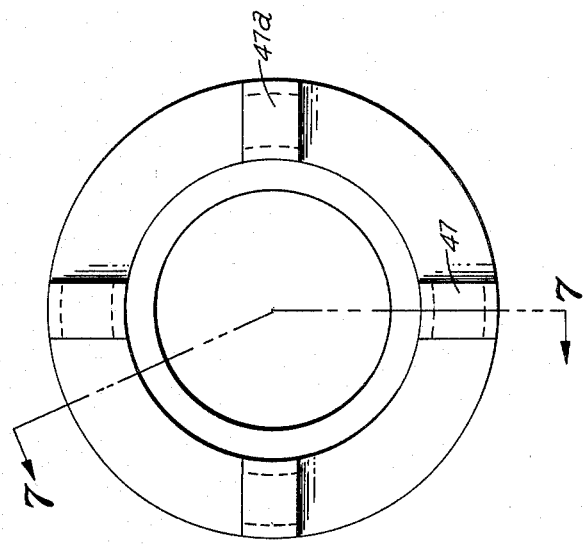

United States Patent Office 3,132,524
Patented May 12, 1964

3,132,524
SUB-MINIATURE FLUID DAMPER GYRO, FITTED WITH TEMPERATURE COMPENSATION MECHANISM
Walter J. Krupick, Franklin, and Michael Gabor, Garfield, N.J., assignors to General Precision Inc., Little Falls, N.J., a corporation of Delaware
Filed July 1, 1960, Ser. No. 40,312
7 Claims. (Cl. 74—5.5)

This invention relates to improvements in fluid damped sub-miniature rate gyros, and is particularly directed to a device for automatically compensating for temperature variations, to maintain the viscous damping of the outer gimball of the gyro substantially constant.

This invention represents an improvement on a sub-miniature rate gyro, an application on which was filed in the U.S. Patent Office, on the 23rd day of May, 1960, by Walter Krupick, Michael Gabor, and Robert S. Billups and assigned Serial No. 31,039, now abandoned.

Rate gyros are commonly employed in high-speed aircraft, missiles and the like, and are frequently subjected to high degrees of acceleration and shock loads.

The fluid damped gyro for this purpose is extensively used because the fluid provides a cushion to protect the small delicate parts of the gyro from shock loading due to high degrees of acceleration. In gyros of the sub-miniature type, this is particularly vital as the component parts of the gyro are extremely small and delicate and subjecting them to shock loads could tend to bend or distort them, thus seriously affecting the accuracy of the instrument. The fluid also partially floats the moving parts of the gyro mechanism, thereby reducing the loading on the bearings, and hence reduces friction and improves the accuracy of the instrument.

In order to maintain the necessary precision of a gyro of this type, it is essential that the operating characteristics of the fluid or the degree of damping be held substantially constant, under varying ambient temperatures, as normally due to the change in viscosity of the fluid with temperature, the degree of damping with a given volume of fluid would be reduced, as the temperature is increased.

In airborne installations in which temperature ranges of the order of —50° F. to plus 200° F. are frequently encountered in relatively short time intervals, this condition is particularly important.

While various types of damping devices have been available, these are generally not particularly reliable, and frequently tend to unduly restrict the flow of damping fluid around the gimbal of the gyro.

One device of this type includes a damping ring, made of a plastic material such as nylon, which is fitted to the interior of the housing of the gyro, to control to some extent the degree of damping of the gyro gimbal, the compensation being provided by the thermal expansion of the damping ring, relative to the outer housing of the gyro assembly.

Due to machining inaccuracies and the tendency of the nylon ring to expand unevenly, there is a tendency to introduce variations in the flow of the damping fluid around the uneven inner circumference of the housing.

In many applications, such as missiles, it is also essential that "warm up" time be reduced to a minimum, and that a gyro be ready for operation in a relatively short time interval. This precludes the use of heating devices of various types, which require a long time to bring up to operating temperature.

With a device of the type covered by this application, a gyro may be prepared for operation in a time interval of from ½ to 1 minute from the time it is started, even though the environmental temperature may be extremely low, the time interval being required to bring the gyro rotor to operating speed, and relatively uniform operating conditions.

In the present construction means are provided for varying the rate of flow of the damping fluid around the gimbal of the gyro, with temperature, so that as the viscosity of the fluid is increased, the volume of flow is reduced, in order to maintain substantially constant damping at all times.

More specifically, it is a device which adjusts the size of the openings through which the damping fluid passes under control the momentary temperature, thus maintaining a relatively constant relation between fluid viscosity and volume of flow, in order to maintain relatively constant damping.

A primary object of the invention is therefore to provide relatively constant fluid damping of the outer gimbal of the gyro, despite wide variations in operating temperature and viscosity of the damping fluid.

Another object is to provide such compensation by bellows controlled hydromechanical means.

Another object is to provide a small, compact, light weight compensating device, so it can be used in a sub-miniature rate gyro.

A further object is to provide a simple, compact device, which can be adjusted with a minimum of force, so that the adjustment is relatively continuous and accurate over a wide temperature range.

The accompanying drawingss, illustrative of one embodiment of the invention, together with the description of its construction and the method of operation, control, adjustment and utilization thereof, will serve to clarify further objects and advantages of my invention.

In the drawings:

FIGURE 1 represents a longitudinal section through one embodiment of the sub-miniature rate gyro fitted with a damping fluid compensation mechanism.

FIGURE 2 is a cross-section through the gyro, and the damping fluid compensation mechanism, shown in FIGURE 1, with the fluid orifice control slide in one adjusted position, the section being taken on the line 2—2, FIGURE 1.

FIGURE 7 is a longitudinal section through the damping fluid orifice control slide, shown in FIGURE 1, the section being taken on the line 7—7, FIGURE 8.

FIGURE 8 is a front elevational view of the damping fluid orifice control slide, shown in FIGURES 1 and 7.

FIGURE 9 is a partial schematic cross-section, similar to FIGURE 2, through another section, the damping fluid orifice control slide, the section being taken on the line 9—9, FIGURE 1.

FIGURE 10 is a longitudinal section, similar to FIGURE 1, through a portion of the gyro shown in FIGURE 1, with the orifice control slide moved leftward to increase the size of the orifice.

Figure 3:
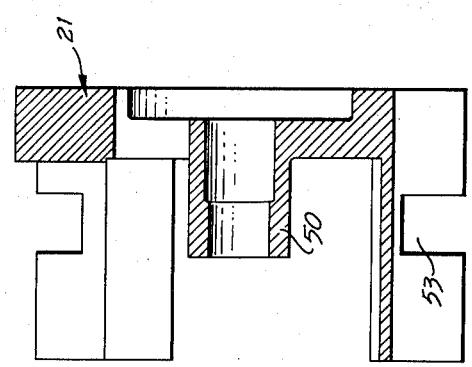
FIGURE 3 is a longitudinal section through the damping mechanism retainer, shown in FIGURE 1, the section being taken on the line 3—3, FIGURE 4.
Figure 4:
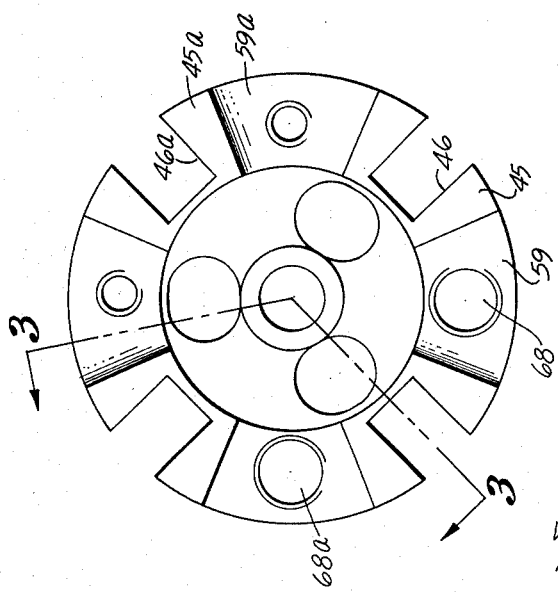
FIGURE 4 is a front elevational view of the damping mechanism retainer, shown in FIGURES 1 and 3.

It will be understood that the following description of the construction and the method of mounting, attachment, operation and utilization of the sub-miniature fluid damped gyro fitted with automatic temperature compensation mechanism is intended as explanatory of the invention and not restrictive thereof.

In the drawings, the same reference numerals designate the same parts throughout the various views, except where otherwise indicated.

One embodiment of the gyro construction shown in FIGURES 1 and 2, which is mounted in a hollow tubular housing 10, comprises a gimbal and motor assembly 12, which is supported for rotational movement or precession, about the longitudinal housing axis 14, by a pair of jewel bearings 15 and 16, located at opposite ends of the gimbal, a left-hand pivot support assembly 17, a take-off assembly 18, which is located adjacent the left-hand end of the gimbal 12, a fluid damping mechanism assembly 19, located adjacent the right-hand end of the gimbal 12, a fluid damping mechanism retainer 21, which operates in conjunction with the damping mechanism in a manner hereinafter described to control the width of an orifice, through which the damping fluid flows, a bellows assembly 22, including a longitudinally expansible corrugated bellows 23, which controls the orifice adjustment of the fluid damping control mechanism in a manner hereinafter described and a torsion bar assembly 25, with which the pivot bearing 26, which forms part of the right-hand jewel bearing 16, is integral. All of these items which are located within a hollow tubular housing are inter-related, and function in a manner hereinafter described in greater detail.

The gimbal and motor assembly which is supported by a pair of jewel bearings 15, 16 mounted at the ends thereof, is partially floated within the tubular housing by means of a damping fluid, such as silicone fluid 27, which fills the interior of the tubular housing 10, the ends of which are sealed in a manner hereinafter described.

The left-hand end of the housing is sealed by an end cap 28, having a cylindrical pilot 29 integral therewith, which fits into the interior of the housing, a circular flange 30, located at the outer end of the cap, being forced against a tubular packing ring 31, of suitable packing material, which abuts the end of the housing, the flange 30 being attached to the housing by means of a press fit or other suitable attaching means.

A tubular hub 33, at the center of the end cap 28, supports the substantially cylindrical pivot retaining member 34 of the pivot support assembly 17, an O-ring 35 fitted to an annular groove, surrounding the outer circumference of the pivot retaining member being provided to seal the interior of the tubular hub 33 of the end cap 28. The pivot retaining member is held in place longitudinally, within the end cap 28, by a snap ring 36, fitted to an annular groove in one end of the cylindrical hub 33, a shim 37, being provided between the snap ring 36 and the pivot retainer to force the pivot retainer toward the gimbal 12.

The right-hand end of the housing is sealed by a circular plate 38, which is attached to the rear (right-hand) end of the bellows, the outer circumference of the circular plate being soldered, or otherwise attached to the interior of the tubular housing, thereby sealing the interior of the housing.

An additional name plate cap 39 is attached to the outer end of the housing by suitable attaching means.

As hereinbefore stated both ends of the housing are sealed, the interior of the housing, between the seals thereof being filled with a damping fluid. This damping fluid provides a cushion to protect the delicate components of the gyro from shock loads, and rapid acceleration, and also buoyantly suspends the gimbal of the gyro, to reduce the load on the bearing pivots 40, 26, thereby reducing bearing wear and friction to a minimum. In addition the damping fluid provides a viscous restraining force for the gimbal 12 of the gyro, to prevent unstable oscillations.

The damping fluid control mechanism is supported by a damping mechanism retainer 21, the outer diameter of the rear portion of which is pressed into and fixedly attached to the interior of the housing.

The retainer consists of a cylindrical rear body section which is pressed into the interior of the housing, and a plurality of equally-spaced legs 45, 45a of circular segmental cross-section, integral with the body section, the legs 45, 45a extending forwardly relative to the body, and being substantially parallel to the longitudinal axis 14 of the housing 10.

The central portion of each of the legs 45, 45a of the damping mechanism retainer 21, has a slot 46, 46a of rectangular cross-section therethrough to receive the legs 47, 47a of mating rectangular cross-section, which are integral with the back plate 48 of a fluid orifice adjustment slide 49, which is shown in detail in FIGURES 7 and 8.

The damping mechanism retainer 21 has a tubular central hub 50 integral therewith and extending forwardly relative to the body section thereof, the interior of the hub being adapted to receive and support the cylindrical section 51, which is integral with the thin cylindrical torsion bar 52 and located forwardly thereof, between the torsion bar 52 and the cylindrical pivot bearing 26.

Each of the legs of the damping mechanism retainer has a slot 53 of substantially rectangular cross-section cut through the outer diameter thereof, each cross-slot being substantially perpendicular to the longitudinal slot 46 through the leg, the cross-slots being adapted to co-act with a corresponding slot 54 of varying cross-section, through each of the legs 47, 47a of the orifice adjustment slide, the detailed operation being hereinafter described.

Figure 6:
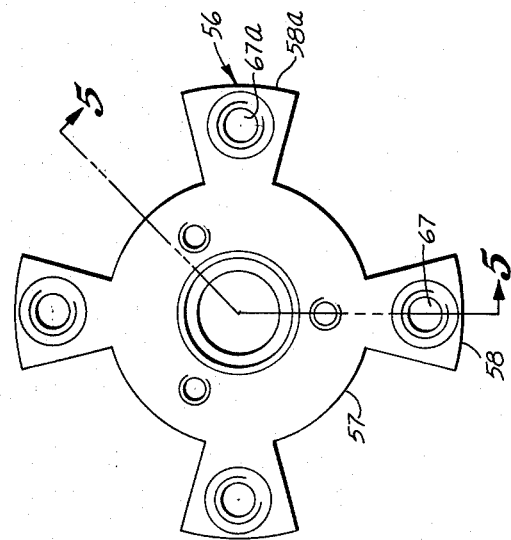
FIGURE 6 is a rear elevational view of the damping fluid paddle shown in FIGURES 1 and 5.
Figure 5:
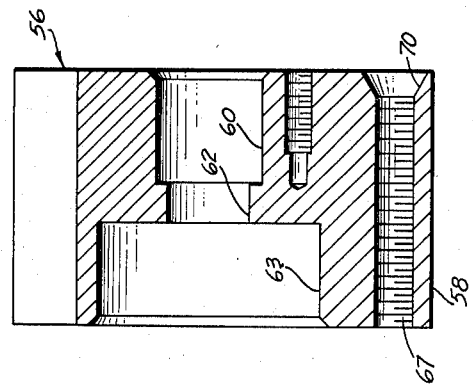
FIGURE 5 is a longitudinal section through the damping fluid paddle shown in FIGURE 1, the section being taken on the line 5—5, FIGURE 6.

A fluid paddle 56, such as that shown in FIGURES 5 and 6, is fitted on to the exterior of gimbal 12 adjacent the forward face of the body of the damping mechanism retainer 21. The fluid paddle 56 comprises a central body 57 of substantially cylindrical form, a series of four segments 58, 58a of trapezoidal cross-sectional contour, the segments being integral with the outer circumference of the central body, each segment being loosely fitted to the trapezoidal area 59, 59a between each pair of legs 45, 45a of the damping mechanism retainer 21, as shown in FIGURE 2. A flat substantially circular plate 42 is integral with the rear end of the torsion bar 52. The plate 42 is attached to the rear face of the body 57 of the fluid paddle 56 by a plurality of screws 43 or other suitable attaching means.

The body 57 of the fluid paddle 56 has a central counterbore 60 in the rear portion thereof, the counterbore being adapted to receive the hub 50 of the damping mechanism retainer therein. A substantially cylindrical opening 62 located between the counterbore 60 and a larger counterbore 63 formed in the forward end of the fluid paddle receives and supports a hollow cylindrical pivot insert jewel 64, which is cemented into the central opening 62, a bearing insert 65, which supports the right-hand pivot bearing pin 26 being pressed into, or otherwise fixedly supported by the pivot insert jewel 64.

Each of the segments 58, 58a of the fluid paddle 56, has a central threaded opening 67, 67a therethrough, each opening being co-axially aligned with a mating internally threaded opening 68 through the body of the damping mechanism retainer 21, as shown in FIGURE 1. A frusto-conical countersink 70 is formed at the rear end of each opening 67, 67a for reasons hereinafter described.

Each opening 67 through the damping mechanism paddle has a substantially cylindrical stud 71, threadably fitted thereto, the studs 71, 71a being longitudinally adjustable relative to the individual segments 58, 58a of the fluid paddle 56, in order to balance the fluid paddle 56 and the gimbal 12 attached thereto.

A cylindrical stop screw 72 is threadably fitted to two of the openings 68, 68a through the body of the damping mechanism retainer 21, the frusto-conical tip 73 of each stop screw, which is considerably smaller than the mating frusto-conical countersink 70, thus allowing the fluid paddle 56 to be rotated through a limited angle depending upon the adjusted position of the stop screw 72. Each stop screw 72 can be longitudinally adjusted relative to the mating frusto-conical countersink by means of the threads, thereby controlling the clearance between the frusto-conical countersink 70 in the fluid paddle member, and the mating tip 73 of the stop screw. The frusto-conical tip of the stop screw limits the rotational angular movement of the fluid paddle 56 and as the gimbal 12 of the gyro is attached to the fluid paddle 56 limits the rotational angular movement of the outer gimbal about its longitudinal axis 14 thereof.

The substantially cylindrical housing 74 of the gimbal 12 has a cylindrical extension 78 of a diameter smaller than the gimbal housing 74 integral therewith, the cylindrical extension 78 being pressed into or otherwise fixedly attached to the larger forward counterbore 63 of the fluid paddle 56.

The metering slot 54 through each leg 47, 47a of the fluid orifice adjustment slide 49 is divided into two sections, as shown in FIGURES 1 and 7, a left-hand or forward shallow section 75, and a relatively deep right-hand section 76, which is in direct communication with the shallow section. As shown in FIGURE 1, the orifice area 77, between the left-hand slot 75 through the leg of the fluid orifice adjustment slide 49 and the right-hand wall of the rectangular cross-slot 53 through the leg 45 of the damping mechanism retainer 21 determines the amount of damping fluid which will pass through the cross-slot 53 at a particular time.

This orifice area 77 is variable under control of the bellows 23 mounted at the right-hand side of the housing 10 in a manner hereinafter described in detail.

In order to increase the orifice area 77, the fluid orifice adjustment slide 49 is moved forward (left-hand, FIGURE 1) from a position in which the front edge of the shallow slot 75 is aligned with the rear edge (right-hand) of the cross-slot 53 through the leg of the damping mechanism retainer, at which point the orifice 77 is closed, to a point at which the forward edge of the shallow slot 75 reaches the front edge (left-hand) of the cross-slot 53 through the leg of the damping mechanism retainer. At this point, the forward or left-hand edge of the deep slot 76 has passed the right-hand edge of the cross-slot 53, thus forming an auxiliary orifice or passage between the deep slot 76 and the cross-slot 53, as shown in FIGURE 10, and substantially increasing the area of the orifice 77 between the paddle segment 56 and the cross-slot 53 through the leg of the damping mechanism retainer 21.

The bellows assembly 22 including the corrugated longitudinally expansible bellows 23, which is located at the rear end of the housing 10, close to the rear plate 39 thereof, is provided to control the longitudinal movement of the orifice adjustment slide 49, co-ordinated with the temperature of the damping fluid 27.

A forward plate 78, which is attached to the forward edge of the bellows 23, is attached to the rear wall 48 of the orifice adjustment slide 49 by soldering or other suitable attaching means, thus co-ordinating the longitudinal movement of the orifice adjustment slide 49, with the longitudinal movement of the front plate 78 attached to the bellows 23 and therefore with the expansion and contraction of the bellows.

This co-ordinates the momentary area of the orifice 77, with the momentary position of the forward plate 78 of the bellows, which is directly controlled by the temperature of the damping fluid surrounding the bellows 23, and engaging the forward plate 78 attached thereto.

When the temperature of the damping fluid is reduced, the volume of the fluid in the housing 10 is reduced, thereby allowing the bellows 23 to expand, and moving the front plate attached to the bellows 23 leftward, thereby moving the orifice adjustment slide 49 leftward and increasing the size of the orifice 77 between the cross-slot 53 and the adjustment slot through the leg of the orifice adjustment slide 49. This allows a larger volume of damping fluid to flow out of the area between each segment of the fluid paddle 56 and the adjacent leg 45 of the damping mechanism retainer. This reduces the damping action against the fluid paddle 56 and therefore the gimbal 12, proportionately to the reduction in temperature, and the corresponding increase in viscosity of the damping fluid.

When the temperature of the assembled unit and therefore the damping fluid is increased, the damping fluid tends to expand, therefore moving the forward plate 78 of the bellows rearward and reducing the length of the bellows 23. This moves the orifice adjustment slide rightward, the slots through the legs 47 of the orifice adjustment slide being moved rightward, thereby progressively decreasing the size of the orifice 77 between the cross-slot 53 and the slot 75 in the orifice adjustment slide 49. This progressively reduces the volume of damping fluid which flows out of the area between each segment of the paddle and the adjacent leg 45 of the damping mechanism retainer. The direction of flow of the damping fluid through the orifices 77 is determined by the momentary rotational angular position of the paddle segments 58, and the corresponding legs 45, 45a of the fixed damping mechanism retainer 21. This increases the damping action against the segments of the fluid paddle 56, and therefore the gimbal 12, proportionately to the increase in temperature and the corresponding reduction in viscosity of the damping fluid.

This tends to hold the damping action between the gimbal 12 and the fluid paddle 56 attached thereto, and the damping fluid substantially constant at all times, regardless of variations in the temperature, and therefore the viscosity of the damping fluid.

This tends to maintain a flow of damping fluid through the housing which is directly co-ordinated with the temperature and therefore the viscosity of the damping fluid. Thus, at high temperatures, when the damping fluid viscosity is low, the orifice opening 77 is relatively small, thereby permitting a relatively small flow of fluid through the orifice 77, thereby increasing the damping action of the fluid against the segments 58 of the paddle 56, 56a and therefore the gimbal 12.

To restrain the longitudinal movement of the forward plate 78 attached to the bellows, the bellows 23 are filled with a light gas, such as helium.

The front plate 78, which is attached to the bellows is in direct contact with the damping fluid, which fills the interior of the housing 10. When the temperature of the damping fluid rises, the damping fluid expands, and its volume increases, thereby moving the forward plate 78 of the bellows assembly 22 rearward. This moves the orifice adjustment slide 49 rearward, thereby moving the slots 75 through the legs thereof in the same direction and progressively reducing the exposed area of the orifices 77 through the legs of the orifice adjustment slide, and thereby restricts the flow of damping fluid through the orifices 77, thereby reducing the flow of damping fluid through the cross-slots 53, from the outer surface of the segments 58, 58a of the fluid paddle 56. If the viscosity of the damping fluid were constant, this action would serve to increase the fluid damping against the segments 58 of the fluid paddle 56, as the damping fluid is pocketed and the damping effect thereof increased. However, since an increase in temperature lowers the viscosity of the damping flued, the net result is to maintain the damping of the fluid paddle, and therefore the gyro gimbal substantially constant about the axis 14, despite the increase in temperature.

However, if the temperature of the outer case 10 and therefore the damping fluid is reduced, the volume of the damping fluid would be correspondingly reduced, thereby allowing the bellows 23 to expand and allowing the front plate 78 attached to the bellows to move forward, thereby moving the orifice adjustment slide 49 forward and increasing the orifice area between the slots 75, and the cross-slots 53, through the legs of the damping mechanism retainer.

This would tend to reduce the damping action against the segments 58 of the fluid paddle, as a larger volume of fluid is permitted to escape. Since the reduction in temperature also increases the viscosity of the damping fluid, and the reduction in temperature also enlarges the orifice areas 77, thereby allowing a larger volume of fluid to escape from the segments 58, 58a of the fluid paddle 56, the net result is to again maintain the damping action of the damping fluid substantially constant.

Thus, it is observed that despite increases or decreases of the temperature of the damping fluid 27, accompanied by corresponding variations in viscosity of the fluid, the damping control mechanism of the present invention operates to maintain the damping of the gimbal of the gyro substantially constant.

It is to be particularly noted that the variations in the area of the orifice 77 formed by the movement of the shallow slots in the orifice adjustment slide in combination with the cross-slots 53 through the legs of the damping mechanism retainer 21, is preferably made to conform to the change in viscosity, of the fluid which is inversely proportional to changes in temperature. The bellows, the expansion which is controlled by the momentary volume occupied by the fluid, under control of its temperature, controls the size of the fluid orifice by controlling the movement of the orifice adjustment slide, thus the degree of damping of the gyro gimbal is maintained substantially constant under all temperature conditions. In one embodiment of the invention the regulating means are designed to correct and compensate for a temperature variation in a silicone type of damping fluid, ranging from about 65° F. to +185° F.

The front plate 78 attached to the bellows has a small boss 80 integral therewith, the boss having a central opening therethrough to support an L-shaped gas filler tube 81 one leg 82 of which is fitted to the interior of the bellows. The outer end of the filler tube, which projects through the bar 80 of the plate 78 is sealed, as by soldering or other suitable means.

Thus, according to the present invention there is provided means for maintaining substantially constant fluid damping in a fluid filled sub-miniature rate gyro despite temperature variations and consequently viscosity variations, over a wide range, without the need for heating or cooling means or heat insulating means, all serving to maintain the temperature of the fluid constant. This invention is therefore to be particularly contrasted with those known devices which seek to maintain constant temperature conditions in a gyro as a means of insuring constant fluid damping, since the present invention allows the temperature of the damping fluid to vary with surrounding temperatures and atmospheric conditions in which the gyro is operated and corrects for such variations by increasing or decreasing the rate of damping fluid circulation through controlled areas, and therefore maintains substantially constant the effectiveness of the damping fluid.

In order to enable a complete understanding of the present invention, numerous specific examples are set forth. It is understood however that the invention is not limited thereto, and such modifications and variations as are embraced by the spirit and scope of the appended claims are contemplated as being within purview of the present invention.

What is claimed is:

1. In combination with a sub-miniature rate gyro, having an outer gimbal mounted for limited rotational movement about a longitudinal axis, a hollow substantially cylindrical housing for enclosing the gyro gimbal, said housing being substantially co-axial with the longitudinal axis of the gyro gimbal and containing a damping fluid, control means providing substantially constant viscous damping of the outer gimbal of the gyro about the longitudinal axis thereof, despite relatively wide variations in the temperature of the damping fluid, said control means including a damping mechanism retainer mounted in the interior of the housing, coaxially therewith, said damping mechanism retainer being fixedly attached to the housing, said damping mechanism retainer having means formed therein adapted to control the flow of damping fluid within the housing along areas substantially perpendicular to the longitudinal axis of the housing, said damping mechanism retainer having a plurality of equally-spaced, radially positioned legs integral therewith, each of said legs being substantially parallel to the longitudinal axis of the gyro gimbal, each of said legs having a longitudinal slot therethrough, substantially parallel to the longitudinal axis of the gyro gimbal, each of said legs having a cross-slot therethrough, the cross-slots being located in a plane substantially perpendicular to the longitudinal axis of the gyro gimbal, a paddle member mounted adjacent the damping mechanism retainer, co-axially therewith, and co-operating with said damping mechanism retainer, said paddle member being fixedly attached to one end of the gyro gimbal, said paddle member having means formed therein adapted to restrain the rotational angular movement of the paddle member and the gyro gimbal, co-ordinated with the flow of damping fluid against portions of the paddle member, and a fluid orifice adjustment member slidably fitted to the damping mechanism retainer to control the size of a plurality of orifices through which the damping fluid flows from areas adjacent portions of the paddle member, thereby controlling the volume of damping fluid permitted to leak out of the damping areas adjoining the paddle member, said fluid orifice adjustment member having a plurality of equally-spaced radially positioned legs integral therewith, said legs of the adjustment member being slidably fitted to the longitudinal slots through the legs of the damping mechanism retainer, each of said legs of the adjustment member having a cross-slot therethrough adapted to communicate with the cross-slots through the legs of the damping mechanism retainer, the cross-slots through the legs of the adjustment member, being adapted to co-act with the cross-slots through the legs of the damping mechanism retainer to provide variable orifices to regulate the leakage of damping fluid through the cross-slots of the damping mechanism retainer, from areas adjoining portions of the paddle member and means attached to said fluid orifice adjustment member, responsive to variations in temperature of the damping fluid adapted to regulate the size of the orifices through the fluid orifice adjustment member, and therefore the flow of damping fluid through said orifices, co-ordinated with the momentary temperature of the damping fluid.

2. In combination with a subminiature rate gyro, having an outer gimbal mounted for limited rotational movement about a longitudinal axis, a hollow substantially cylindrical housing for enclosing the gyro gimbal, the interior of said housing being filled with a viscous damping fluid, said housing being substantially co-axial with the longitudinal axis of the gyro gimbal and containing a damping fluid, control means providing substantially constant viscous damping of the outer gimbal of the gyro about the longitudinal axis thereof, despite relatively wide variations in the temperature of the damping fluid, said control means including a damping mechanism retainer mounted in the interior of the housing, co-axially therewith, said damping mechanism retainer being fixedly attached to the housing, said damping mechanism retainer having means formed therein adapted to control the flow of damping fluid within the housing along areas substantially perpendicular to the longitudinal axis of the housing, said damping mechanism retainer having a plurality of equally-spaced, radially positioned legs integral therewith, each of said legs being substantially parallel to the longitudinal axis of the gyro gimbal, each of said legs having a longitudinal slot therethrough, substantially parallel to the longitudinal axis of the gyro gimbal, each of said legs having a cross-slot therethrough, the cross-slots being located in a plane substantially perpendicular to the longiudinal axis of the gyro gimbal, a paddle member mounted adjacent the damping mechanism retainer, co-axially therewith, and co-operating with said damping mechanism retainer, said paddle member being fixedly attached to one end of the gyro gimbal, said paddle member having means formed therein adapted to restrain the rotational angular movement of the paddle member and the gyro gimbal, co-ordinated with the flow of damping fluid against portions of the paddle member, and a fluid orifice adjustment member slidably fitted to the damping mechanism retainer, the paddle member including a plurality of equally-spaced, radially positioned segments, the segments being integral with the paddle member, each of said segments being substantially parallel to the longitudinal axis of the gyro gimbal, each of said segments being loosely fitted between a pair of legs of the damping mechanism retainer, the segments being adapted to control the rotational angular movement of the paddle member and the gyro gimbal attached thereto, under control of the damping fluid, each of said paddle member segments having a substantially circular opening therethrough, substantially parallel to the longitudinal axis of the segment, the end of each of said openings directed toward the damping mechanism retainer, having a frusto-conical countersink therein, each of the openings through the body of the damping mechanism retainer having an externally threaded stop screw fitted thereto, in nominal axial alignment with one of the openings through an aligned paddle member segment, the stop screw having a frusto-conical tip integral therewith, and directed toward one of the paddle member segment countersinks, the frusto-conical tips of the stop screws being adapted to engage the mating frusto-conical countersinks on the paddle member segments, to adjustably limit the rotational angular movement of the paddle member under control of the stop screws and a fluid orifice adjustment member slidably fitted to the damping mechanism retainer, said fluid orifice adjustment member having adjustable means incorporated therewith adapted to co-act with the damping mechanism retainer to control the size of a plurality of orifices through which the damping fluid flows from areas adjacent portions of the paddle member, thereby controlling the volume of damping fluid permitted to leak out of the damping areas adjoining the paddle member, said fluid orifice adjustment member having a plurality of equally-spaced radially positioned legs integral therewith, said legs of the adjustment member being slidably fitted to the longitudinal slots through the legs of the damping mechanism retainer, each of said legs of the adjustment member having a cross-slot therethrough adapted to communicate with the cross-slots through the legs of the damping mechanism retainer, the cross-slots through the legs of the adjustment member, being adapted to co-act with the cross-slots through the legs of the damping mechanism retainer to provide variable orifices to regulate the leakage of damping fluid through the cross-slots of the damping mechanism retainer, from areas adjoining portions of the paddle member, and means attached to said fluid orifice adjustment member, responsive to variations in temperature of the damping fluid, adapted to regulate the size of the orifices through the fluid orifice adjustment member, and therefore the flow of damping fluid through said orifices, co-ordinated with the momentary temperature of the damping fluid.

3. In combination with a sub-miniature rate gyro, having an outer gimbal mounted for limited rotational movement about a longitudinal axis, a hollow substantially cylindrical housing for enclosing the gyro gimbal, said housing being substantially co-axial with the longitudinal axis of the gyro gimbal and containing a damping fluid, control means providing substantially constant viscous damping of the outer gimbal of the gyro about the longitudinal axis thereof, despite relatively wide variations in the temperature of the damping fluid, said control means including a damping mechanism retainer mounted in the interior of the housing, co-axially therewith, said retainer being fixedly attached to the housing, said damping mechanism retainer having means formed therein adapted to control the flow of damping fluid within the housing along areas substantially perpendicular to the longitudinal axis of the housing, said damping mechanism retainer having a plurality of equally-spaced radially positioned legs integral therewith, each of said legs being substantially parallel to the longitudinal axis of the gyro gimbal, each of said legs having a cross-slot therethrough, the cross-slots being located in a plane substantially perpendicular to the longitudinal axis of the gyro gimbal, said damping mechanism retainer having a substantially cylindrical body section integral and co-axial therewith, the body section of the damping mechanism retainer having a plurality of radially positioned openings therethrough, each of said openings being located between a pair of legs of the damping mechanism retainer and substantially parallel to the longitudinal axis of the damping mechanism retainer, each of said openings being internally threaded, a paddle member mounted adjacent the damping mechanism retainer, co-axially therewith and co-operating with said damping mechanism retainer, said paddle member being fixedly attached to one end of the gyro gimbal, the paddle member including a plurality of equally-spaced radially positioned segments integral therewith, each of said segments being substantially parallel to the longitudinal axis of the gyro gimbal, each of said segments being loosely fitted between a pair of legs of the damping mechanism retainer, the segments being adapted to control the rotational angular movement of the paddle member and the gyro gimbal attached thereto, under control of the damping fluid, each of said paddle member segments having a substantially circular opening therethrough, substantially parallel to the longitudinal axis of the segment, the end of each of said openings directed toward the damping mechanism retainer, having a frusto-conical countersink therein, each of the openings through the body of the damping mechanism retainer having an externally threaded stop screw fitted thereto, in nominal axial alignment with one of the openings through an aligned paddle member segment, the stop screw having a frusto-conical tip integral therewith, and directed toward one of the paddle member segment countersinks, the frusto-conical tips of the stop screws being adapted to engage the mating frusto-conical countersinks in the paddle member segments, to adjustably limit the rotational angular movement of the paddle member under control of the stop screws and a fluid orifice adjustment member slidably fitted to the damping mechanism retainer, said fluid orifice adjustment member having adjustable means incorporated therewith, adapted to co-act with the damping mechanism retainer to control the size of a plurality of orifices through which the damping fluid flows from areas adjacent portions of the paddle member, thereby controlling the volume of damping fluid permitted to leak out of the damping areas adjoining the paddle member, and means attached to said fluid orifice adjustment member, responsive to variations in temperature of the damping fluid, adapted to regulate the size of the orifices through the fluid, orifice adjustment member, and therefore the flow of damping fluid through said orifices, co-ordinated with the momentary temperature of the damping fluid, said temperature responsive means including a gas filled bellows, said bellows having a plate attached to one end thereof, the plate attached to said bellows being in contact with said damping fluid, said bellows being longitudinally expandable and contractable in response to variations in volume of the damping fluid in the housing, to longitudinally position said fluid orifice adjustment member, to vary the size of the orifices by means of which the leakage of the damping fluid from the areas adjacent portions of the paddle member, is controlled.

4. In combination with a sub-miniature rated gyro, having an outer gimbal mounted for limited rotational movement about a longitudinal axis, a hollow substantially cylindrical housing for enclosing the gyro gimbal, said housing being substantially co-axial with the longitudinal axis of the gyro gimbal and containing a damping fluid, control means providing substantially constant viscous damping of the outer gimbal of the gyro about the longitudinal axis thereof, despite relatively wide variations in the temperature of the damping fluid, said control means including a damping mechanism retainer mounted in the interior of the housing, co-axially therewith, said damping mechanism retainer being fixedly attached to the housing, said damping mechanism retainer having means formed therein adapted to control the flow of damping fluid within the housing along areas substantially perpendicular to the longitudinal axis of the housing, said damping mechanism retainer having a plurality of equally-spaced radially positioned legs integral therewith, each of said legs being substantially parallel to the longitudinal axis of the gyro gimbal, each of said legs having a cross-slot therethrough, the cross-slots being located in a plane substantially perpendicular to the longitudinal axis of the gyro gimbal, said damping mechanism retainer having a substantially cylindrical body section integral and co-axial therewith, the body section of the damping mechanism retainer having a plurality of radially positioned openings therethrough, each of said openings being located between a pair of legs of the damping mechanism retainer and substantially parallel to the longitudinal axis of the damping mechanism retainer, each of said openings being internally threaded, a paddle member mounted adjacent the damping mechanism retainer, co-axially therewith and co-operating with said damping mechanism retainer, the paddle member including a plurality of equally-spaced radially positioned segments integral therewith, each of said segments being substantially parallel to the longitudinal axis of the gyro gimbal, each of said segments being loosely fitted between a pair of legs of the damping mechanism retainer, the segments of the paddle member being adapted to control the rotational angular movement of the paddle member and the gyro gimbal attached thereto, under control of the flow of damping fluid against the segments of the paddle member, each of said paddle member segments having a substantially circular opening therethrough, substantially parallel to the longitudinal axis of the segment, the end of each of said openings directed toward the damping mechanism retainer, having a frusto-conical countersink therein, each of the openings through the body of the damping mechanism retainer having an externally threaded stop screw fitted thereto, in nominal axial alignment with one of the openings through an aligned paddle member segment, the stop screw having a frusto-conical tip integral therewith, and directed toward one of the paddle member segment countersinks, the frusto-conical tips of the stop screws being adapted to engage the mating frusto-conical countersinks in the paddle member segments, to adjustably limit the rotational angular movement of the paddle member under control of the stop screws and a fluid orifice adjustment member slidably fitted to the damping mechanism retainer, said fluid orifice adjustment member having adjustable means incorporated therewith, adapted to co-act with the damping mechanism retainer to control the size of a plurality of orifices through which the damping fluid flows from areas adjacent portions of the paddle member, thereby controlling the volume of damping fluid permitted to leak out of the damping areas adjoining the paddle member, and means attached to said fluid orifice adjustment member, responsive to variations in temperature of the damping fluid, adapted to regulate the size of the orifices through the fluid orifice adjustment member, and therefore the flow of damping fluid through said orifices, co-ordinated with the momentary temperature of the damping fluid.

5. In a fluid damped sub-miniature gyro, said gyro being mounted in a hollow substantially cylindrical housing, said housing having a gyro gimbal fitted thereto co-axial with the longitudinal axis of the housing, said housing being filled with a viscous damping fluid, means for maintaining the viscous damping of the gyro substantially constant about a longitudinal axis, despite wide variations in the temperature of the damping fluid, a damping mechanism retainer mounted in the interior of the housing, co-axially therewith, said damping mechanism retainer being fixedly attached to the housing, said damping mechanism retainer having means formed therein adapted to control the flow of damping fluid within the housing, along areas substantially perpendicular to the longitudinal axis of the housing, the damping mechanism retainer having a plurality of equally-spaced radially positioned legs integral therewith, each of said legs being substantially parallel to the longitudinal axis of the gyro gimbal, each of said legs having a cross-slot therethrough, the cross-slots being located in a plane substantially perpendicular to the longitudinal axis of the gyro gimbal, a paddle member rotatably mounted adjacent the damping mechanism retainer, co-axially therewith, said paddle member being fixedly attached to one end of the gyro gimbal, bearing means rotatably supporting the paddle member and the adjacent end of the gyro gimbal, co-axially with the longitudinal axis of the housing, the paddle member including a plurality of equally-spaced radially positioned segments integral therewith, the axis of each of said segments being substantially parallel to the longitudinal axis of the gyro gimbal, each of said segments being radially loosely fitted between a pair of legs of the damping mechanism retainer, the segments being adapted to control the rotational angular movement of the paddle member, and the gyro gimbal attached thereto, under control of the rate of impingement of the damping fluid against the segments of the paddle member, each of the segments of the paddle member having a substantially circular internally threaded opening therethrough, the axis of each of said openings being substantially parallel to the longitudinal axis of the paddle member segment, a substantially cylindrical stud threadably fitted to each of said openings, each of said studs being longitudinally adjustable relative to the corresponding segment of the paddle member, the studs being adapted to adjust the rotational balance of the paddle member, and the gyro gimbal to which it is attached, an orifice adjustment member slidably fitted to the damping mechanism retainer, said orifice adjustment member having adjustable means incorporated therewith, adapted to co-act with the damping mechanism retainer, to adjustably control the size of a plurality of orifices through which the damping fluid flows, from areas adjacent portions of the paddle member, thereby controlling the volume of damping fluid permitted to leak out of the damping areas adjoining said portions of the paddle member, and means attached to said orifice adjustment member, responsive to variations in temperature of the damping fluid, adapted to control the longitudinal movement of the orifice adjustment member, co-ordinated with the damping fluid temperature, thereby to control the leakage of damping fluid relative to the paddle member, co-ordinated with variations in temperature thereof.

6. In a fluid damped sub-miniature gyro, said gyro being mounted in a hollow substantially cylindrical housing, said housing having a gyro gimbal fitted thereto, the gyro gimbal being mounted for limited rotational movement about a longitudinal axis, said housing being filled with a viscous damping fluid, means for maintaining the viscous damping of the gyro substantially constant about a longitudinal axis, despite wide variations in the temperature of the damping fluid, a damping mechanism retainer mounted in the interior of the housing, co-axially therewith, said damping mechanism retainer being fixedly attached to the housing, said damping mechanism retainer having means formed therein adapted to control the flow of damping fluid within the housing, along areas substantially perpendicular to the longitudinal axis of the housing, said damping mechanism retainer having a plurality of equally-spaced radially positioned legs integral therewith, each of said legs being substantially parallel to the longitudinal axis of the gyro gimbal, each of said legs having a cross-slot therethrough, the cross-slots being located in a plane substantially perpendicular to the longitudinal axis of the gyro gimbal, a paddle member rotatably mounted adjacent the damping mechanism retainer, co-axially therewith, said paddle member being fixedly attached to one end of the gyro gimbal, bearing means rotatably supporting the paddle member and the adjacent end of the gyro gimbal, co-axially with the longitudinal axis of the housing, the paddle member including a plurality of equally-spaced, radially positioned segments of substantially trapezoidal cross-section integral therewith, each of said segments of the paddle member being substantially parallel to the longitudinal axis of the gyro gimbal, each of said segments being loosely fitted to the gap between the adjoining legs of the damping mechanism retainer, an orifice adjustment member slidably fitted to the damping mechanism retainer, said orifice adjustment member having adjustable means incorporated therewith, adapted to co-act with the damping mechanism retainer, to adjustably control the size of a plurality of orifices through which the damping fluid flows, from areas adjacent portions of the paddle member, thereby controlling the volume of damping fluid permitted to leak out of the damping areas adjoining said portions of the paddle member, said fluid orifice adjustment member having a plurality of equally-spaced radially positioned legs integral therewith, the cross-sectional contour of each of said legs of the orifice adjustment member following substantially the cross-sectional contour of the longitudinal slots through the legs of the damping mechanism retainer, each of said legs of the orifice adjustment member having a cross-slot therethrough, adapted to directly communicate with the cross-slot through the corresponding leg of the damping mechanism retainer, the cross-slots through the legs of the orifice adjustment member, being adapted to co-act with the slots through the legs of the damping mechanism retainer, to vary the area of the cross slot through the orifice adjustment member communicating directly with the cross-slot through the leg of the damping mechanism retainer, to provide orifices of variable area to regulate the leakage of the damping fluid through the cross-slots of the damping mechanism retainer, thereby to regulate the damping action against the segments of the paddle member, co-ordinated with the longitudinal movement of the orifice adjustment member and means attached to said orifice adjustment member, responsive to variations in temperature of the damping fluid, adapted to control the longitudinal movement of the orifice adjustment member, co-ordinated with the damping fluid temperature, thereby to control the leakage of damping fluid relative to the paddle member, coordinated with variations in the temperature thereof.

7. In combination with a fluid damped gyro, as in claim 6, the means responsive to the temperature of the damping fluid being a longitudinally expansible gas filled bellows with a plurality of longitudinally spaced convolutions, said bellows having a plate attached to one end thereof, the outer surface of said plate attached to the bellows being exposed to the damping fluid, said bellows being longitudinally expansible and contractable in response to variations in volume of the damping fluid, to longitudinally position said orifice adjustment member, thereby to regulate the area of the orifices through the legs of the orifice adjustment member.

References Cited in the file of this patent

UNITED STATES PATENTS

| | | |
|---|---|---|
| 2,834,213 | Fredericks | May 13, 1958 |
| 2,864,256 | Haagens et al. | Dec. 16, 1958 |
| 2,945,380 | Pope et al. | July 19, 1960 |